(12) United States Patent
Feng et al.

(10) Patent No.: US 11,789,615 B2
(45) Date of Patent: Oct. 17, 2023

(54) NONVOLATILE MEMORY SCHEDULING METHOD, SYSTEM AND DEVICE, AND READABLE STORAGE MEDIUM

(71) Applicant: INSPUR ELECTRONIC INFORMATION INDUSTRY CO., LTD., Shandong (CN)

(72) Inventors: Zhen Feng, Shandong (CN); Dong Zhang, Shandong (CN); Bingheng Yan, Shandong (CN)

(73) Assignee: INSPUR ELECTRONIC INFORMATION INDUSTRY CO., LTD., Shandong (CN)

( * ) Notice: Subject to any disclaimer, the term of this patent is extended or adjusted under 35 U.S.C. 154(b) by 0 days.

(21) Appl. No.: 17/924,868

(22) PCT Filed: Feb. 19, 2021

(86) PCT No.: PCT/CN2021/076874
§ 371 (c)(1),
(2) Date: Nov. 11, 2022

(87) PCT Pub. No.: WO2021/248935
PCT Pub. Date: Dec. 16, 2021

(65) Prior Publication Data
US 2023/0195315 A1    Jun. 22, 2023

(30) Foreign Application Priority Data
Jun. 12, 2020    (CN) .......................... 202010538125.5

(51) Int. Cl.
G06F 3/06    (2006.01)
(52) U.S. Cl.
CPC .......... *G06F 3/0613* (2013.01); *G06F 3/0634* (2013.01); *G06F 3/0653* (2013.01)

(58) Field of Classification Search
CPC ..... G06F 3/0613; G06F 3/0634; G06F 3/0653
See application file for complete search history.

(56) References Cited

U.S. PATENT DOCUMENTS

| 2011/0138115 A1* | 6/2011 | Oh .......................... G06F 12/08 |
| | | 711/E12.001 |
| 2012/0203999 A1* | 8/2012 | Jess ....................... G06F 3/0605 |
| | | 711/E12.002 |

(Continued)

FOREIGN PATENT DOCUMENTS

| CN | 103810113 A | 5/2014 |
| CN | 104040512 A | 9/2014 |

(Continued)

OTHER PUBLICATIONS

Feng, Yazhi, et al. "Multiple subpage writing FTL in MLC by exploiting dual mode operations." IEEE Transactions on Computer-Aided Design of Integrated Circuits and Systems 39.3 (2019): 599-612. (Year: 2019).*

(Continued)

*Primary Examiner* — Nicholas J Simonetti
(74) *Attorney, Agent, or Firm* — IPRO, PLLC (57) ABSTRACT

A nonvolatile memory scheduling method, system and device, and a computer-readable storage medium. The method includes: obtaining a utilization rate of a current memory space (S101); when the utilization rate is less than a first threshold, determining a first space to be converted of the memory space, converting the first space into a high-speed storage space, and storing data in a conventional storage device into the high-speed storage space (S102); and when the utilization rate is greater than a second threshold, determining a second space to be converted of the high-speed storage space, storing data stored in the second space (Continued)

into the conventional storage device, and converting the second space into the memory space (S103).

17 Claims, 3 Drawing Sheets

(56) References Cited

U.S. PATENT DOCUMENTS

| | | | |
|---|---|---|---|
| 2014/0281064 A1* | 9/2014 | Imazaki | G06F 3/0665 |
| | | | 710/74 |
| 2018/0088853 A1* | 3/2018 | Kotra | G06F 12/0842 |
| 2018/0188963 A1 | 7/2018 | Yao et al. | |
| 2020/0020360 A1* | 1/2020 | Kosuru | G11C 16/10 |
| 2020/0097182 A1* | 3/2020 | Volvovski | G06F 3/0649 |
| 2021/0334021 A1* | 10/2021 | Devasigamony | G06F 3/0647 |
| 2022/0100406 A1* | 3/2022 | Zhou | G06F 3/0616 |

FOREIGN PATENT DOCUMENTS

| | | |
|---|---|---|
| CN | 106649152 A | 5/2017 |
| CN | 109389213 A | 2/2019 |
| CN | 111722804 A | 9/2020 |

OTHER PUBLICATIONS

Ozturk, Ozcan, Mahmut Kandemir, and Mary Jane Irwin. "Increasing on-chip memory space utilization for embedded chip multiprocessors through data compression." Proceedings of the 3rd IEEE/ACM/IFIP international conference on Hardware/software codesign and system synthesis. 2005. (Year: 2005).*
PCT/CN2021/076874 international search report.

* cited by examiner

NONVOLATILE MEMORY SCHEDULING METHOD, SYSTEM AND DEVICE, AND READABLE STORAGE MEDIUM

CROSS-REFERENCE TO RELATED APPLICATION

The present application claims the priority of the Chinese patent application filed on Jun. 12, 2020 before the CNIPA, China National Intellectual Property Administration with the application number of 202010538125.5 and the title of "NONVOLATILE MEMORY SCHEDULING METHOD, SYSTEM AND DEVICE, FOR SCHEDULING NON-VOLATILE MEMORY, AND READABLE STORAGE MEDIUM", which is incorporated herein in its entirety by reference.

FIELD

The present application relates to the field of memory scheduling, in particular to a method, system and device for scheduling a non-volatile memory, and a readable storage medium.

BACKGROUND

A non-volatile memory is a new type of storage medium that may replace the next generation memory specification DDR4 for use as a system memory, as well as solid state drives or mechanical hard drives for use as a data memory. When used as a data memory, the non-volatile memory has a much greater data transfer bandwidth than a conventional data memory.

In the prior art, a server system configured with non-volatile memory devices is able to retain memory data even in the event of a sudden power failure on a server by taking advantage of the feature of nonvolatility of this new storage medium, thereby improving the recoverability of an application system. However, this technology uses the non-volatile memory devices exclusively for memory and does not consider the possibility of use as a data memory based on the high bandwidth thereof.

SUMMARY

The present application aims to provide a method, system and device for scheduling a non-volatile memory, and a readable storage medium, so as to increase the read-write rate of a data memory while improving the utilization rate of non-volatile memory devices based on the features of non-volatility and high bandwidth of the devices.

In order to solve the above technical problems, the present application provides a method for scheduling a non-volatile memory, including:
  acquiring a utilization rate of a current memory space;
  determining, in the case that the utilization rate is less than a first threshold, a first to-be-converted space of the memory space, converting the first to-be-converted space into a high-speed storage space, and storing data from a conventional storage device into the high-speed storage space; and
  determining, in the case that the utilization rate is greater than a second threshold, a second to-be-converted space of the high-speed storage space, storing data stored in the second to-be-converted space into the conventional storage device, and converting the second to-be-converted space into the memory space; and
  the second threshold is greater than the first threshold.

In an embodiment of the present application, the determining a first to-be-converted space of the memory space includes:
  calculating a capacity of a used memory space based on the utilization rate;
  calculating, based on the capacity of the used memory space, a capacity of the memory space in the case that the utilization rate is equal to a third threshold, and determining a capacity of the first to-be-converted space as a capacity variation of the memory space; and
  determining the first to-be-converted space in a free space of the memory space based on the capacity of the first to-be-converted space; and
  the third threshold is greater than the first threshold and less than the second threshold.

In an embodiment of the present application, the storing data from a conventional storage device into the high-speed storage space includes:
  calculating degrees of activity of data in the conventional storage device; and
  storing data with a degree of activity greater than a first preset value into the high-speed storage space.

In an embodiment of the present application, the calculating degrees of activity of data in the conventional storage device includes:
  slicing the data in the conventional storage device to obtain data slices;
  counting read-write frequency of each of the data slices in the unit of a preset time period; and
  calculating a degree of activity of each of the data slices based on the read-write frequency.

In an embodiment of the present application, the determining a second to-be-converted space of the high-speed storage space includes:
  calculating a capacity of a used memory space based on the utilization rate;
  calculating, based on the capacity of the used memory space, a capacity of the memory space in the case that the utilization rate is equal to a fourth threshold, and determining a capacity of the second to-be-converted space as a capacity variation of the memory space;
  calculating degrees of activity of data in the high-speed storage space, and storing data with a degree of activity less than a second preset value into the conventional storage device; and
  determining the second to-be-converted space in a free space of the high-speed storage space based on the capacity of the second to-be-converted space; and
  the fourth threshold is greater than the first threshold and less than the second threshold.

The present application further provides a system for scheduling a non-volatile memory, including:
  an acquiring module, configured to acquire a utilization rate of a current memory space;
  a first conversion module, configured to determine, in the case that the utilization rate is less than a first threshold, a first to-be-converted space of the memory space, convert the first to-be-converted space into a high-speed storage space, and store data from a conventional storage device into the high-speed storage space; and
  a second conversion module, configured to determine, in the case that the utilization rate is greater than a second threshold, a second to-be-converted space of the high-speed storage space, store data stored in the second to-be-converted space into the conventional storage device, and convert the second to-be-converted space into the memory space; and the second threshold is greater than the first threshold.

In an embodiment of the present application, the first conversion module includes:

a first calculation sub-module, configured to calculate a capacity of a used memory space based on the utilization rate;

a first determining sub-module, configured to calculate, based on the capacity of the used memory space, a capacity of the memory space in the case that the utilization rate is equal to a third threshold, and determine a capacity of the first to-be-converted space as a capacity variation of the memory space; and a second determining sub-module, configured to determine the first to-be-converted space in a free space of the memory space based on the capacity of the first to-be-converted space; and the third threshold is greater than the first threshold and less than the second threshold.

In an embodiment of the present application, the first conversion module includes:

a second calculation sub-module, configured to calculate degrees of activity of data in the conventional storage device; and a first storage sub-module, configured to store data with a degree of activity greater than a first preset value into the high-speed storage space.

The present application further provides a device for scheduling a non-volatile memory, including:

a memory, configured to store a computer program; and a processor, configured to implement the operations of the method for scheduling the non-volatile memory according to any one of the above embodiments when executing the computer program.

The present application further provides a readable storage medium, a computer program is stored on the readable storage medium, and the operations of the method for scheduling the non-volatile memory according to any one of the above embodiments are implemented when the computer program is executed by a processor.

The present application provides a method for scheduling a non-volatile memory. The method includes: acquiring a utilization rate of a current memory space; determining, in the case that the utilization rate is less than a first threshold, a first to-be-converted space of the memory space, converting the first to-be-converted space into a high-speed storage space, and storing data from a conventional storage device into the high-speed storage space; and determining, in the case that the utilization rate is greater than a second threshold, a second to-be-converted space of the high-speed storage space, storing data stored in the second to-be-converted space into the conventional storage device, and converting the second to-be-converted space into the memory space; and the second threshold is greater than the first threshold.

By means of the technical solution according to the present application, by converting the memory space into the high-speed storage space and storing the data from the conventional storage device into the high-speed storage space in the case that the utilization rate of the current memory space is less than the first threshold, the read-write speed of the data memory is increased while the utilization rate of the device is improved; and by storing the data stored in the high-speed storage space into the conventional storage device and then converting the high-speed storage space into the memory space in the case that the utilization rate of the current memory space is greater than the second threshold, server lag caused by high memory occupation is avoided, and the operation speed of a server is ensured. The present application further provides a system and device for scheduling a non-volatile memory, and a readable storage medium, with the above beneficial effects, which will not be repeated herein.

BRIEF DESCRIPTION OF THE DRAWINGS

In order to more clearly explain the embodiments of the present application or the technical solutions in the prior art, the following will briefly introduce the drawings needed to be used in the embodiments or the prior technical description. Obviously, the drawings in the following description are only some embodiments of the present application. For ordinary technicians in the field, they may also obtain other embodiments according to these drawings without paying creative labor.

DETAILED DESCRIPTION

The core of the present application is to provide a method, system and device for scheduling a non-volatile memory, and a readable storage medium, so as to increase the read-write rate of a data memory while improving the utilization rate of non-volatile memory devices based on the features of nonvolatility and high bandwidth of the devices.

In order to make the purposes, technical solutions and advantages of the embodiments of the application clearer, the following will describe the technical solutions in the embodiments of the present application clearly and completely in combination with the drawings in the embodiments of the present application. Obviously, the described embodiments are part of the embodiments of the present application, not all of them. Based on the embodiments in the present application, all other embodiments obtained by ordinary technicians in the art without doing creative work belong to the scope of protection in the present application.

Figure 1:
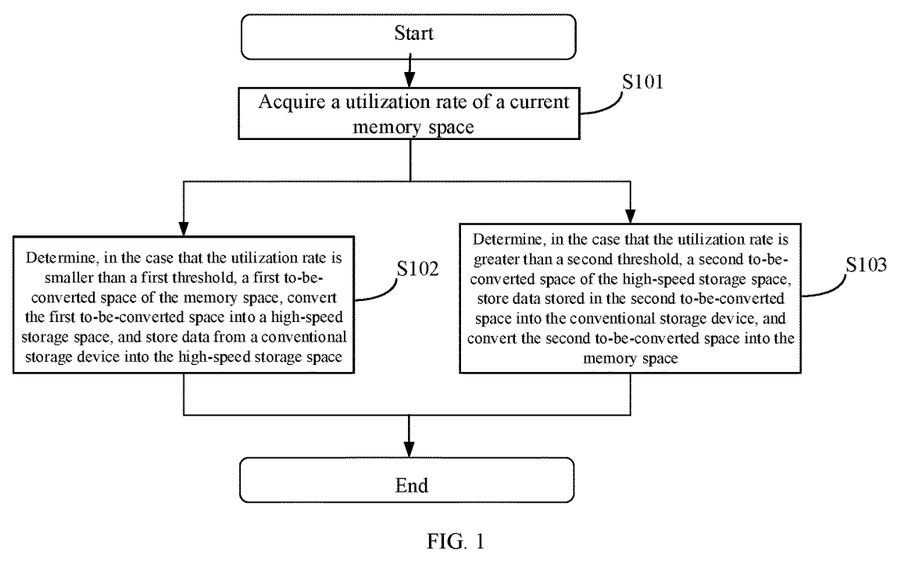
FIG. 1 is a flow chart of a method for scheduling a non-volatile memory according to the embodiments of the present application.

Reference is made to FIG. 1, which is a flow chart of a method for scheduling a non-volatile memory according to an embodiment of the present application.

The method specifically includes the following steps:

S101: acquiring a utilization rate of a current memory space.

Aiming at the problem that in the prior art, the non-volatile memory devices are exclusively used for memory, and the possibility of use as a data memory based on the feature of high bandwidth thereof is not considered, the present application provides the method for scheduling the non-volatile memory, so as to increase the read-write rate of the data memory while improving the utilization rate of the non-volatile memory devices based on the features of non-volatility and high bandwidth of the devices.

In an implementation of the present application, a specific way to acquire the utilization rate of the current memory space may be to determine the utilization rate of the current memory space by calculating a ratio of an occupied memory space to a total memory space.

S102: determining, in the case that the utilization rate is less than a first threshold, a first to-be-converted space of the memory space, convert the first to-be-converted space into a high-speed storage space, and store data from a conventional storage device into the high-speed storage space.

In this step, in the case that the utilization rate is less than the first threshold, it indicates that at this time the utilization rate of the current memory space is low and a free memory space is large. In this case, in order to improve the utilization rate of the device and increasing the read-write speed of the data memory at the same time, the present application converts part of the memory space into the high-speed storage space to store data.

In an implementation of the present application, determining the first to-be-converted space of the memory space may also be specifically implemented by performing steps shown in FIG. 2, which is illustrated below in conjunction with FIG. 2.

Figure 2:
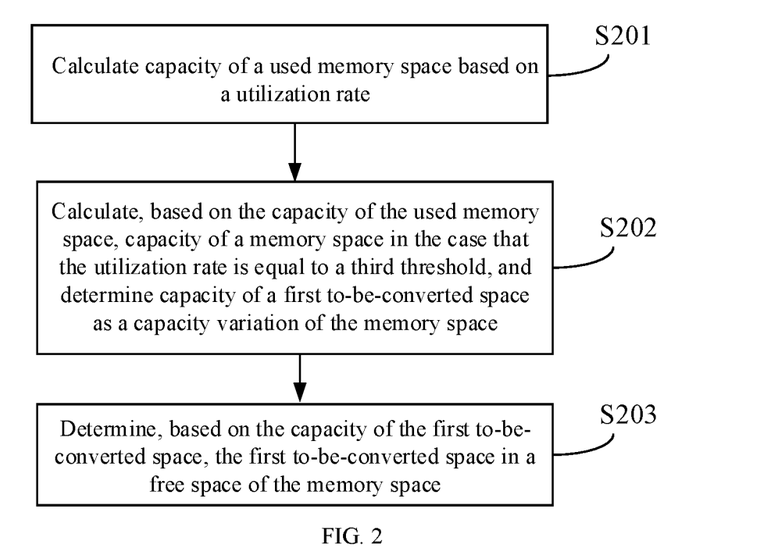
FIG. 2 is a flow chart of a practical representation of S102 in a method for scheduling a non-volatile memory provided in FIG. 1.

Reference is made to FIG. 2, which is a flow chart of a practical representation of S102 in the method for scheduling the non-volatile memory provided in FIG. 1.

The following steps are specifically included:

S201: calculating a capacity of a used memory space based on the utilization rate.

In an implementation of the present application, the capacity of the used memory space may be obtained specifically by multiplying the utilization rate by a capacity of the total memory space.

S202: calculating, based on the capacity of the used memory space, a capacity of the memory space in the case that the utilization rate is equal to a third threshold, and determining a capacity of the first to-be-converted space as a capacity variation of the memory space.

In an implementation of the present application, the capacity of the memory space in the case that the utilization rate is equal to the third threshold may be specifically obtained by dividing the capacity of the used memory space by the third threshold, and thus the capacity of the first to-be-converted space is a difference between the capacity of the total memory space and the capacity of the memory space in the case that the utilization rate is equal to the third threshold.

S203: determining the first to-be-converted space in a free space of the memory space based on the capacity of the first to-be-converted space.

The third threshold referred to herein is greater than the first threshold and less than a second threshold.

In this step, after the capacity of the first to-be-converted space is determined, a space of the same capacity as the first to-be-converted space is divided out from the free space of the memory space, and the space is used as the first to-be-converted space.

In an implementation of the present application, in order to further increase the read and write rates of the data memory, data with a high degree of activity may also be stored into the high-speed storage space, namely, storing the data from the conventional storage device into the high-speed storage space in step S102, which may be implemented specifically by performing the following steps:

calculating degrees of activity of data in the conventional storage device; and storing data with a degree of activity greater than a first preset value into the high-speed storage space.

Further, a specific way to calculate the degrees of activity of the data in the conventional storage device may be to:

slice the data in the conventional storage device to obtain data slices;

count read-write frequency of each of the data slices in the unit of a preset time period; and calculate a degree of activity of each of the data slices based on the read-write frequency.

S103: determining, in the case that the utilization rate is greater than the second threshold, a second to-be-converted space of the high-speed storage space, storing data stored in the second to-be-converted space into the conventional storage device, and converting the second to-be-converted space into the memory space.

In this step, the second threshold referred to herein is greater than the first threshold, and in the case that the utilization rate of the current memory space is greater than the second threshold, it indicates that the utilization rate of the current memory space is high, and the memory space may not be sufficient. In this case, in order to avoid the server lag caused by high memory occupation and ensure the operation speed of a server, the present application stores the data stored in the high-speed storage space into the conventional storage device, and then converts the high-speed storage space into the memory space, which avoids the above problems.

Figure 3:
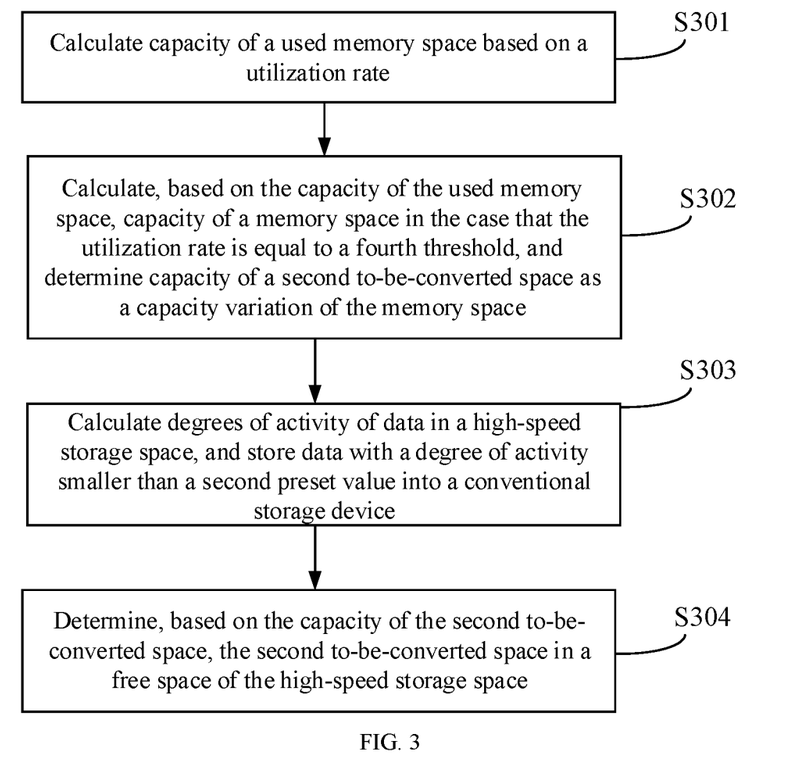
FIG. 3 is a flow chart of a practical representation of S103 in a method for scheduling a non-volatile memory provided in FIG. 1.

In an implementation of the present application, in order to minimize the impact of conversion of the high-speed storage space on the read-write rate of the data memory, data with a low degree of activity may be transferred to the conventional storage device, so as to ensure that data with a high degree of activity is in the high-speed storage space, namely, determining the second to-be-converted space of the high-speed storage space referred to herein, which may also be specifically implemented by performing the steps shown in FIG. 3, as illustrated below in combination with FIG. 3.

Reference is made to FIG. 3, which is a flow chart of a practical representation of S103 in the method for scheduling the non-volatile memory provided in FIG. 1.

The following steps are specifically included:

S301: calculating the capacity of the used memory space based on the utilization rate.

S302: calculating, based on the capacity of the used memory space, a capacity of the memory space in the case that the utilization rate is equal to a fourth threshold, and determining a capacity of the second to-be-converted space as a capacity variation of the memory space.

S303: calculating degrees of activity of data in a high-speed storage space, and storing data with a degree of activity less than a second preset value into the conventional storage device.

S304: determining the second to-be-converted space in the free space of the high-speed storage space based on the capacity of the second to-be-converted space.

The fourth threshold is greater than the first threshold and less than the second threshold.

Based on the above technical solution, by means of the method for scheduling the non-volatile memory according to the present application, by converting the memory space into the high-speed storage space in the case that the utilization rate of the current memory space is less than the first threshold, and storing the data from the conventional storage device into the high-speed storage space, the read-write speed of the data memory is increased while the device utilization rate is improved; and by storing the data stored in the high-speed storage space into the conventional storage device in the case that the utilization rate of the current memory space is greater than the second threshold, and then converting the high-speed storage space into the memory space, server lag caused by high memory occupation is avoided, and the operation speed of the server is ensured.

Figure 4:
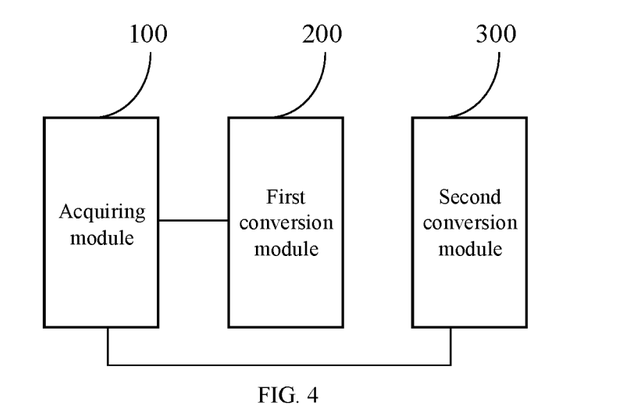
FIG. 4 is a structural diagram of a system for scheduling a non-volatile memory according to the embodiments of the present application.

Reference is made to FIG. 4, which is a structural diagram of a system for scheduling a non-volatile memory according to an embodiment of the present application.

The system may include:
- an acquiring module 100, configured to acquire a utilization rate of a current memory space;
- a first conversion module 200, configured to determine, in the case that the utilization rate is less than a first threshold, a first to-be-converted space of the memory space, convert the first to-be-converted space into a high-speed storage space, and store data from a conventional storage device into the high-speed storage space; and
- a second conversion module 300, configured to determine, in the case that the utilization rate is greater than a second threshold, a second to-be-converted space of the high-speed storage space, store data stored in the second to-be-converted space into the conventional storage device, and convert the second to-be-converted space into the memory space.

The second threshold is greater than the first threshold.

On the basis of the above embodiment, in a specific embodiment, the first conversion module 200 may include:
- a first calculation sub-module, configured to calculate a capacity of a used memory space based on the utilization rate;
- a first determining sub-module, configured to calculate, based on the capacity of the used memory space, a capacity of the memory space in the case that the utilization rate is equal to a third threshold, and determine a capacity of the first to-be-converted space as a capacity variation of the memory space; and
- a second determining sub-module, configured to determine the first to-be-converted space in a free space of the memory space based on the capacity of the first to-be-converted space;

The third threshold is greater than the first threshold and less than the second threshold.

On the basis of the above embodiment, in a specific embodiment, the first conversion module 200 may include:
- a second calculation sub-module, configured to calculate degrees of activity of data in the conventional storage device; and
- a first storage sub-module, configured to store data with a degree of activity greater than a first preset value into the high-speed storage space.

Further, the second calculation sub-module includes:
- a slicing unit, configured to slice the data in the conventional storage device to obtain data slices;
- a counting unit, configured to count read-write frequency of each of the data slices in the unit of a preset time period; and
- a calculation unit, configured to calculate a degree of activity of each of the data slices based on the read-write frequency.

On the basis of the above embodiment, in a specific embodiment, the second conversion module 300 may include:
- a third calculation sub-module, configured to calculate the capacity of the used memory space based on the utilization rate;
- a fourth calculation sub-module, configured to calculate, based on the capacity of the used memory space, capacity of the memory space in the case that the utilization rate is equal to a fourth threshold, and determine capacity of the second to-be-converted space as a capacity variation of the memory space;
- a fifth calculation sub-module, configured to calculate degrees of activity of data in the high-speed storage space, and store data with a degree of activity less than a second preset value into the conventional storage device; and
- a third determining sub-module, configured to determine the second to-be-converted space in a free space of the high-speed storage space based on the capacity of the second to-be-converted space.

The fourth threshold is greater than the first threshold and less than the second threshold.

Since the embodiment of the system corresponds to the embodiment of the method, the embodiment of the system may be referred to the description of the embodiment of the method, which will not be repeated herein.

Figure 5:
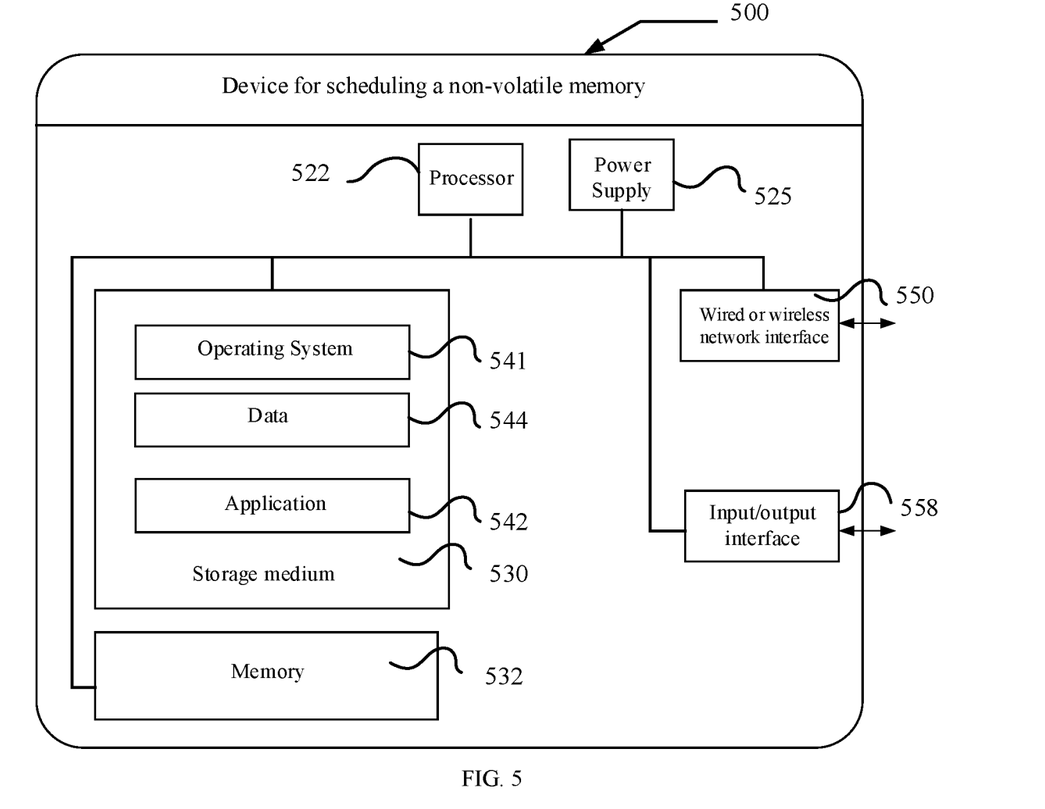
FIG. 5 is a structural diagram of a device for scheduling a non-volatile memory according to the embodiments of the present application.

Reference is made to FIG. 5, which is a structural diagram of a device for scheduling a non-volatile memory according to an embodiment of the present application.

The device 500 for scheduling the non-volatile memory may vary greatly depending on configuration or performance, and may include one or more central processing units (CPUs) 522 (such as one or more processors), a memory 532, and one or more storage media 530 (such as one or more mass-storage devices) for storing applications 542 or data 544. The memory 532 and the storage medium 530 may be ephemeral storage or persistent storage. The programs stored in the storage medium 530 may include one or more modules (not shown), each of which may include a series of instruction operations for the device. Furthermore, the processor 522 may be set to communicate with the storage medium 530 to execute the series of instruction operations in the storage medium 530 on the device 500 for scheduling the non-volatile memory.

The device 500 for scheduling the non-volatile memory may further include one or more power supplies 525, one or more wired or wireless network interfaces 550, one or more input/output interfaces 558, and/or, one or more operating systems 541, such as Windows Server™, Mac OS X™, Unix™, Linux™, and FreeBSD™.

The steps in the above method for scheduling the non-volatile memory as described in FIG. 1 to FIG. 3 are implemented by the device for scheduling the non-volatile memory based on the structure shown in FIG. 5.

Those skilled in the art may clearly understand that, for the convenience and simplicity of description, the specific working process of the above described systems, devices and modules may refer to the corresponding process in the above method embodiments, and will not be repeated here.

In several embodiments provided in the present application, it should be understood that the disclosed device, apparatus and method may be realized in other ways. For example, the device embodiments described above are only schematic, for example, the division of modules is only a logical function division, and there may be another division method when actually implemented, for example, multiple modules or components may be combined or integrated into another system, or some features may be ignored or not implemented. On the other hand, the mutual coupling or direct coupling or communication connection shown or discussed may be indirect coupling or communication connection through some interfaces, devices or modules, and may be electrical, mechanical or other forms.

The modules described as separate components may or may not be physically separated, and the components displayed as modules may or may not be physical modules, that is, they may be located in one place or distributed to multiple network modules. Some or all of the modules may be selected according to the actual needs to achieve the purpose of this embodiment.

In addition, each functional module in each embodiment of the present application may be integrated in a processing module, or each module may exist physically independently, or two or more modules may be integrated in a module. The above integrated modules may be implemented in the form of hardware or software function modules.

If the integrated modules are implemented in the form of software functional modules and sold or used as independent products, they may be stored in a computer readable storage medium. Based on this understanding, the technical solution of the present application, in essence, or the part that contributes to the prior art, or the whole or part of the technical solution, may be embodied in the form of a software product, which is stored in a storage medium, which includes a number of instructions to enable a computer device (which may be a personal computer, a function calling device, or a network device, etc.) to perform all or part of the steps of the methods of the various embodiments of the present application. The aforementioned storage media include: USB flash disk, mobile hard disk, read only memory (ROM), random access memory (RAM), magnetic disc or optical disc and other media that may store program codes.

The method, system, device and readable storage medium for scheduling the non-volatile memory provided in the present application are described in detail above. In this paper, specific examples are used to explain the principle and implementation mode of the present application. The above examples are only used to help understand the method and core idea of the application. It should be pointed out that for ordinary technicians in the technical field, certain improvements and modifications may be made to the present application without departing from the principles of the application, and these improvements and modifications also fall within the protection scope of the claims of the application.

It should also be noted that in this specification, relational terms such as first and second are only used to distinguish one entity or operation from another entity or operation, and do not necessarily require or imply any such actual relationship or order between these entities or operations. Moreover, the terms "including", "comprising" or any other variant thereof are intended to cover non-exclusive inclusion, so that a process, method, article or equipment including a series of elements not only includes those elements, but also includes other elements not explicitly listed, or also includes elements inherent to such process, method, article or equipment. Without more restrictions, the elements defined by the statement "including one . . . " do not exclude that there are other identical elements in the process, method, article or equipment including the elements.

The invention claimed is:

1. A method for scheduling a non-volatile memory, comprising:
acquiring a utilization rate of a current memory space;
determining, in the case that the utilization rate is less than a first threshold, a first to-be-converted space of the current memory space, converting the first to-be-converted space into a high-speed storage space, and storing data from a conventional storage device into the high-speed storage space; and
determining, in the case that the utilization rate is greater than a second threshold, a second to-be-converted space of the high-speed storage space, storing data stored in the second to-be-converted space into the conventional storage device, and converting the second to-be-converted space into the current memory space;
wherein, the second threshold is greater than the first threshold;
wherein the determining a first to-be-converted space of the current memory space comprises:
calculating a capacity of a used memory space based on the utilization rate;
calculating, based on the capacity of the used memory space, a capacity of a memory space in the case that the utilization rate is equal to a third threshold, and determining a capacity of the first to-be-converted space as a capacity variation of the memory space; and
determining the first to-be-converted space in a free space of the current memory space based on the capacity of the first to-be-converted space;
wherein, the third threshold is greater than the first threshold and less than the second threshold.

2. The method according to claim 1, wherein the storing data from a conventional storage device into the high-speed storage space comprises:
calculating degrees of activity of data in the conventional storage device; and
storing data with a degree of activity greater than a first preset value into the high-speed storage space.

3. The method according to claim 2, wherein the calculating degrees of activity of data in the conventional storage device comprises:
slicing the data in the conventional storage device to obtain data slices;
counting read-write frequency of each of the data slices in the unit of a preset time period; and
calculating a degree of activity of each of the data slices based on the read-write frequency.

4. The method according to claim 1, wherein the determining a second to-be-converted space of the high-speed storage space comprises:
calculating the capacity of the used memory space based on the utilization rate;
calculating, based on the capacity of the used memory space, the capacity of the memory space in the case that the utilization rate is equal to a fourth threshold, and determining a capacity of the second to-be-converted space as the capacity variation of the memory space;
calculating degrees of activity of data in the high-speed storage space, and storing data with a degree of activity less than a second preset value into the conventional storage device;
and determining the second to-be-converted space in a free space of the high-speed storage space based on the capacity of the second to-be-converted space;
wherein, the fourth threshold is greater than the first threshold and less than the second threshold.

5. The method according to claim 1, wherein the acquiring a utilization rate of a current memory space comprises:

determining the utilization rate of the current memory space by calculating a ratio of an occupied memory space to a total memory space.

6. The method according to claim 1, wherein the calculating a capacity of a used memory space based on the utilization rate comprises:
obtaining the capacity of the used memory space by multiplying the utilization rate by a capacity of a total memory space.

7. The method according to claim 1, wherein the calculating, based on the capacity of the used memory space, the capacity of the memory space in the case that the utilization rate is equal to a third threshold, and determining a capacity of the first to-be-converted space as the capacity variation of the memory space comprises:
obtaining the capacity of the memory space in the case that the utilization rate is equal to the third threshold by dividing the capacity of the used memory space by the third threshold;
and
determining a difference between the capacity of a total memory space and the capacity of the memory space in the case that the utilization rate is equal to the third threshold as the capacity of the first to-be-converted space.

8. A device for scheduling a non-volatile memory, comprising:
a memory, configured to store a computer program; and
a processor, when executing the computer program, configured to:
acquire a utilization rate of a current memory space;
determine, in the case that the utilization rate is less than a first threshold, a first to-be-converted space of the current memory space, convert the first to-be-converted space into a high-speed storage space, and store data from a conventional storage device into the high-speed storage space; and
determine, in the case that the utilization rate is greater than a second threshold, a second to-be-converted space of the high-speed storage space, store data stored in the second to-be-converted space into the conventional storage device, and convert the second to-be-converted space into the current memory space;
wherein, the second threshold is greater than the first threshold;
wherein the determine a first to-be-converted space of the current memory space comprises:
calculating a capacity of a used memory space based on the utilization rate;
calculating, based on the capacity of the used memory space, a capacity of a memory space in the case that the utilization rate is equal to a third threshold, and determining a capacity of the first to-be-converted space as a capacity variation of the memory space; and
determining the first to-be-converted space in a free space of the current memory space based on the capacity of the first to-be-converted space;
wherein, the third threshold is greater than the first threshold and less than the second threshold.

9. The device according to claim 8, wherein the store data from a conventional storage device into the high-speed storage space comprises:
calculating degrees of activity of data in the conventional storage device; and
storing data with a degree of activity greater than a first preset value into the high-speed storage space.

10. The device according to claim 9, wherein the calculating degrees of activity of data in the conventional storage device comprises:
slicing the data in the conventional storage device to obtain data slices;
counting read-write frequency of each of the data slices in the unit of a preset time period; and
calculating a degree of activity of each of the data slices based on the read-write frequency.

11. The device according to claim 8, wherein the determine a second to-be-converted space of the high-speed storage space comprises:
calculating the capacity of the used memory space based on the utilization rate;
calculating, based on the capacity of the used memory space, the capacity of the memory space in the case that the utilization rate is equal to a fourth threshold, and determining a capacity of the second to-be-converted space as the capacity variation of the memory space;
calculating degrees of activity of data in the high-speed storage space, and storing data with a degree of activity less than a second preset value into the conventional storage device; and
determining the second to-be-converted space in a free space of the high-speed storage space based on the capacity of the second to-be-converted space;
wherein, the fourth threshold is greater than the first threshold and less than the second threshold.

12. The device according to claim 8, wherein the acquire a utilization rate of a current memory space comprises:
determining the utilization rate of the current memory space by calculating a ratio of an occupied memory space to a total memory space.

13. A non-transitory computer-readable storage medium, wherein a computer program is stored on the computer-readable storage medium, when the computer program is executed by a processor, causes the processor to:
acquire a utilization rate of a current memory space;
determine, in the case that the utilization rate is less than a first threshold, a first to-be-converted space of the current memory space, convert the first to-be-converted space into a high-speed storage space, and store data from a conventional storage device into the high-speed storage space; and
determine, in the case that the utilization rate is greater than a second threshold, a second to-be-converted space of the high-speed storage space, store data stored in the second to-be-converted space into the conventional storage device, and convert the second to-be-converted space into the current memory space;
wherein, the second threshold is greater than the first threshold;
wherein the determine a second to-be-converted space of the high-speed storage space comprises:
calculating a capacity of a used memory space based on the utilization rate;
calculating, based on the capacity of the used memory space, a capacity of a memory space in the case that the utilization rate is equal to a fourth threshold, and determining a capacity of the second to-be-converted space as a capacity variation of the memory space;
calculating degrees of activity of data in the high-speed storage space, and storing data with a degree of activity less than a second preset value into the conventional storage device; and determining the second to-be-converted space in a free space of the high-speed storage space based on the capacity of the second to-be-converted space;

wherein, the fourth threshold is greater than the first threshold and less than the second threshold.

14. The non-transitory computer-readable storage medium according to claim 13, wherein the determine a first to-be-converted space of the current memory space comprises:

calculating the capacity of the used memory space based on the utilization rate;

calculating, based on the capacity of the used memory space, the capacity of the memory space in the case that the utilization rate is equal to a third threshold, and determining a capacity of the first to-be-converted space as the capacity variation of the memory space; and determining the first to-be-converted space in a free space of the current memory space based on the capacity of the first to-be-converted space;

wherein, the third threshold is greater than the first threshold and less than the second threshold.

15. The non-transitory computer-readable storage medium according to claim 13, wherein the store data from a conventional storage device into the high-speed storage space comprises:

calculating degrees of activity of data in the conventional storage device; and storing data with a degree of activity greater than a first preset value into the high-speed storage space.

16. The non-transitory computer-readable storage medium according to claim 15, wherein the calculating degrees of activity of data in the conventional storage device comprises:

slicing the data in the conventional storage device to obtain data slices;

counting read-write frequency of each of the data slices in the unit of a preset time period; and calculating a degree of activity of each of the data slices based on the read-write frequency.

17. The non-transitory computer-readable storage medium according to claim 13, wherein the acquire a utilization rate of a current memory space comprises:

determining the utilization rate of the current memory space by calculating a ratio of an occupied memory space to a total memory space.

* * * * *